UNITED STATES PATENT OFFICE.

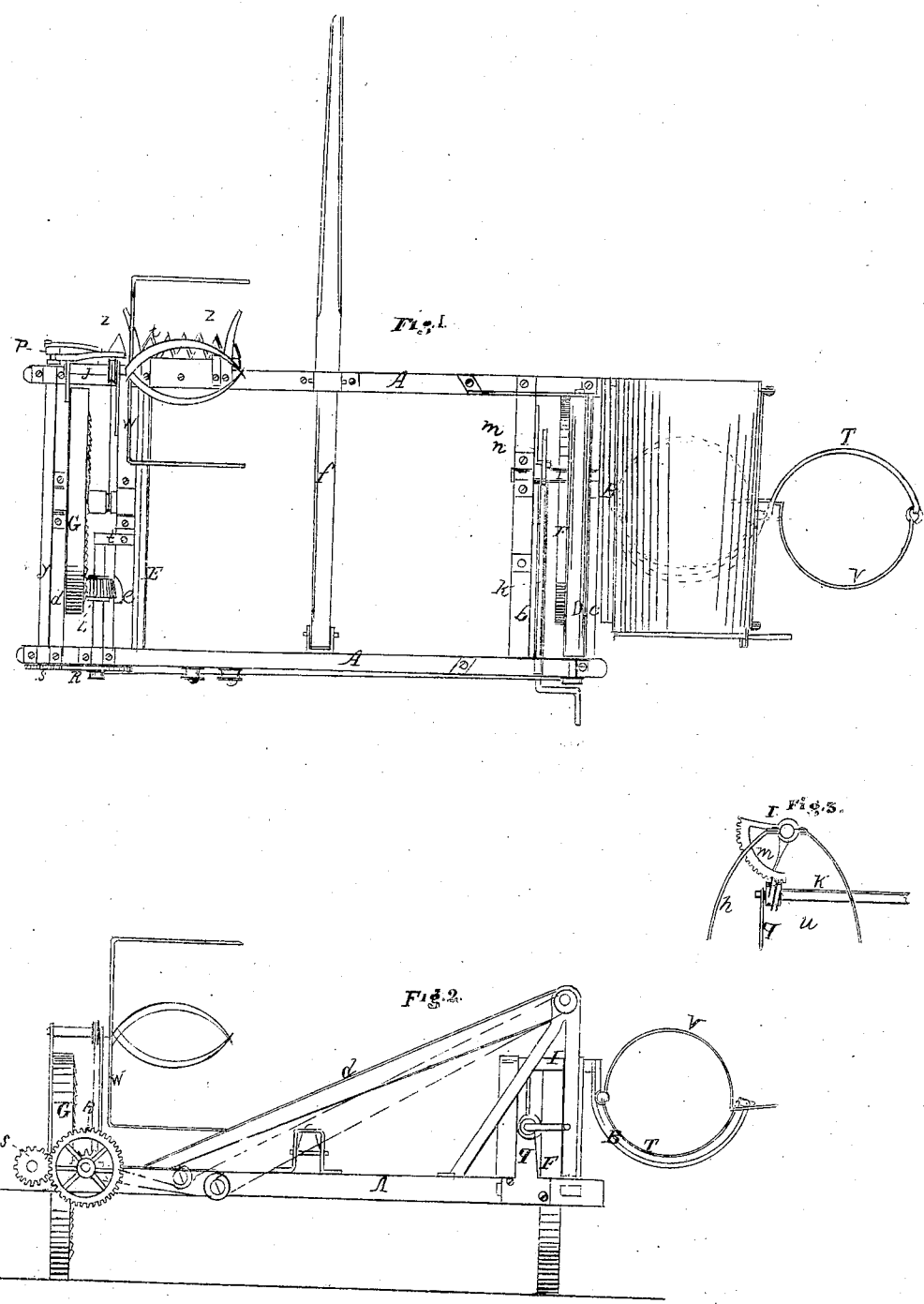

T. A. RISHER, OF OSKALOOSA, IOWA.

IMPROVEMENT IN CORN-HARVESTERS.

Specification forming part of Letters Patent No. 40,641, dated November 17, 1863.

*To all whom it may concern:*

Be it known that I, T. A. RISHER, of the town of Oskaloosa, and State of Iowa, have invented certain new and useful Improvements in Corn-Harvesters; and I hereby declare that the following is a true and exact description of the same, reference being had to the accompanying drawings, and to the letters of reference marked thereon.

The nature of my invention consists in the use of certain devices for gathering and shocking corn, in the manner hereinafter described.

In the drawings which make a part of this specification, Figure 1 is a plan view of my harvester. Fig. 2 is a side elevation. Fig. 3 is a side view of worm-wheel and shaft, together with a segment of a cog-wheel geared into the worm-wheel.

In Fig. 1, A represents the side pieces of the frame $b\ c$, and $d\ e$ represent the cross-ties that bind the sides A together. F and G represent the two wheels that give motion to the machine. The axle upon which the wheel F turns rests on bearings on the cross-ties $b$ and $c$.

The letter $h$ in Fig. 3 represent the supports, on the top of which the shaft I rests. These two supports are secured at bottom to the respective cross-ties $b$ and $c$.

K represents a shaft extending from outside of frame A to point underneath the segment of a cog-wheel, (marked $m$.) The shaft K is supported at its ends by two stanchions or braces, $q$, (see Fig. 2,) one of which is fastened to frame A and the other to the cross-tie $b$. Shaft K is furnished with the worm-wheel $n$, (see Fig. 3,) which is geared with the segment $m$. The shaft I extends a little beyond the end of the cross-tie $c$, and is fastened to the shocker-frame B, which runs parallel with tie $c$.

T represents the concave, which rests in the shocker-frame B, and is intended to receive the corn preparatory to its being shocked. The concave T is hinged at its outer side and at each end to the shocker-frame B, so that it can be raised out of frame B and its position reversed by turning the crank on K from right to left. As soon as the shocker-frame reaches a vertical position the concave T, owing to its being hung a little inward on top, swings around, occupying the position as shown in blue lines in Fig. 1. The semicircular clamp V, which is hinged to the outer edge of concave T, is thrown back, and the corn, being relieved from its pressure, descends to the ground in the form of a shock.

D represents the roller around which the endless belt passes, the other end of the belt passing around the roller E. Roller D is supported by stanchions which rest on the sides of frame marked A. At the opposite end of the frame the driving-wheel G is placed, with its axle resting on the ties $d$ and $e$. The wheel G has cogs on its inner side, which play in the spur-pinion L. The shaft on which pinion L works rests at its outer end on the top of A, and at the outer end plays in the bearing $t$. To the outer end of this shaft the cog-wheel R is fastened, and is geared in the pinion $s$ on the shaft $y$. Shaft $y$ has its bearings on the two sides of A, and runs parallel with tie $d$. The end opposite to the cutters has a double crank attached to it, (marked P.) To this crank the two pitmen that give motion to the cutters are attached.

J represents a small shaft with a pulley on it, and having its bearings at the top of two stanchions fastened to the ties $d$ and $e$. The gudgeon on the inner end of shaft J is made to extend through the stanchion sufficiently far to support the reel W, which is formed of two pieces, of suitable size, crossing each other at their center and at right angles, and after extending some three feet (more or less) from the shaft J form an elbow. The length from the elbow to the end of the pieces that form the reel W will be about two feet and a half, and are made to curve at the inner edge, so as to hold the corn within its grasp securely until it is laid on the endless belt $d$. The reel W is operated by a band running from the shaft of wheel G to a pulley on shaft J.

The two pulleys $x\ x$ are intended as guides to the band that passes over a pulley on the end of roller D and another pulley fastened on the outside of the cog-wheel R. The object of this band is to give motion to the roller D, which moves the endless belt.

The letter Z represent the guides or prongs, which are made to curve outward to take in the corn more readily and bring it under the action of the knives.

$d$ represents the endless belt, and $f$ the tongue of the machine.

In operating my machine it will be observed that the driving-wheel G gives motion to the pinion L and the cog-wheel R, both being on the same shaft. R, being geared into the pinion S on the shaft Y, imparts motion to the pitmen that operate the cutters. By means of the band running from the pulley attached to R to the one on D the endless belt is operated. The concave T, in connection with the shocker-frame B, performs its office, as already described—that is, by turning the shaft K from right to left T is thrown outside of frame B to discharge the corn, and by reversing the motion of shaft K, T and B are again brought back to a horizontal position.

Having thus described my machine, what I claim, and desire to secure by Letters Patent, is—

1. The arrangement of shaft K, with the worm-wheel n, when used in connection with the shaft I, to which the segment m is attached, substantially as and for the purpose specified.

2. Hanging the concave T, which receives the corn, at two points to the outer side of shocker-frame, substantially as and for the purpose set forth.

T. A. RISHER.

Witnesses:
 Jo. C. CLAYTON,
 CHARLES ALEXANDER.